United States Patent [19]

Moore et al.

[11] 4,117,804
[45] Oct. 3, 1978

[54] SELF-DEODORIZING LITTER BOX

[75] Inventors: Ray G. Moore; William M. Coffman, Jr., both of Tulsa, Okla.

[73] Assignee: Ivan Pope, Tulsa, Okla.; a part interest

[21] Appl. No.: 787,747

[22] Filed: Apr. 15, 1977

[51] Int. Cl.$^2$ ............................................. A01K 29/00
[52] U.S. Cl. ........................................................ 119/1
[58] Field of Search ........................................... 119/1

[56] References Cited

U.S. PATENT DOCUMENTS

| | | | |
|---|---|---|---|
| 3,233,588 | 2/1966 | Thomas | 119/1 |
| 3,332,397 | 7/1967 | Vander Wall | 119/1 |
| 3,796,188 | 3/1974 | Bradstreet | 119/1 |
| 3,908,597 | 9/1975 | Taylor | 119/1 |

*Primary Examiner*—Hugh R. Chamblee
*Attorney, Agent, or Firm*—Head, Johnson & Chafin

[57] ABSTRACT

A self-deodorizing litter box for pets and comprising a box having a first compartment open at the top thereof for receiving a supply of pet litter therein, a second compartment open at the top of the box and in substantial alignment with the first compartment for receiving the pet litter therefrom, a partition and filter means are provided between the first and second compartments, and the filter member is a suitable filter material, such as wire mesh for filtering the pet litter as it is moved from one open compartment to the other, a closed compartment provided beneath both open compartments, independent floor members provided for each open compartment and interposed between the open compartments and the closed compartment, each floor member being slidable between open and closed positions for providing selective communication between the open compartments and the closed compartment for discharge of filtered materials from the pet litter into the closed compartment, and deodorizing chemicals disposed in the closed compartment for deodorizing the materials contained in the closed compartment.

5 Claims, 14 Drawing Figures

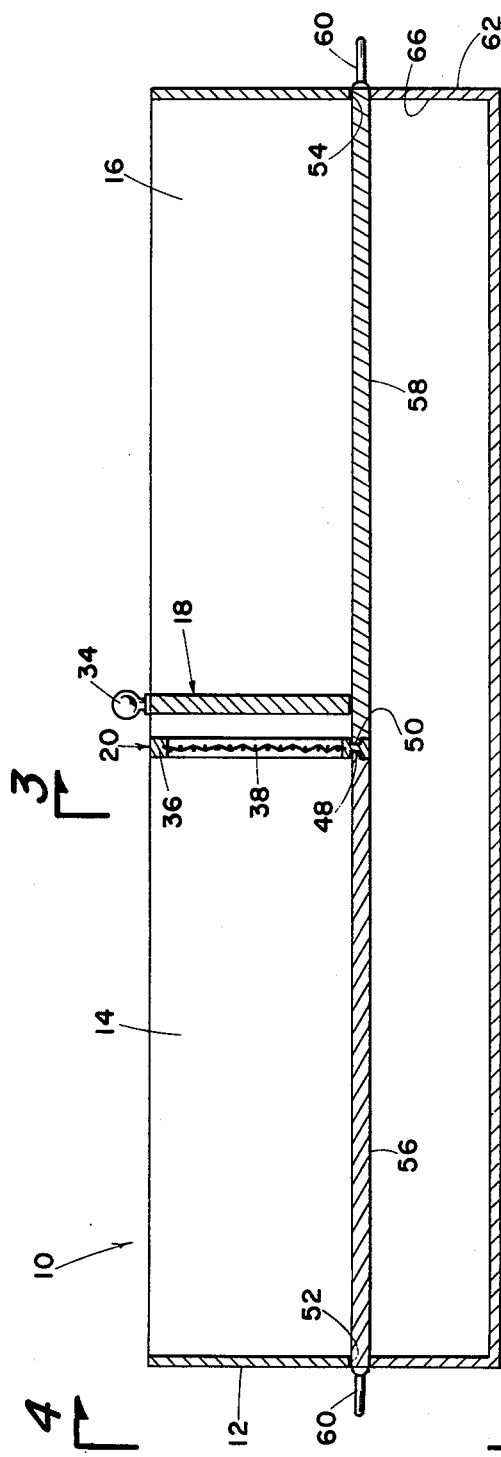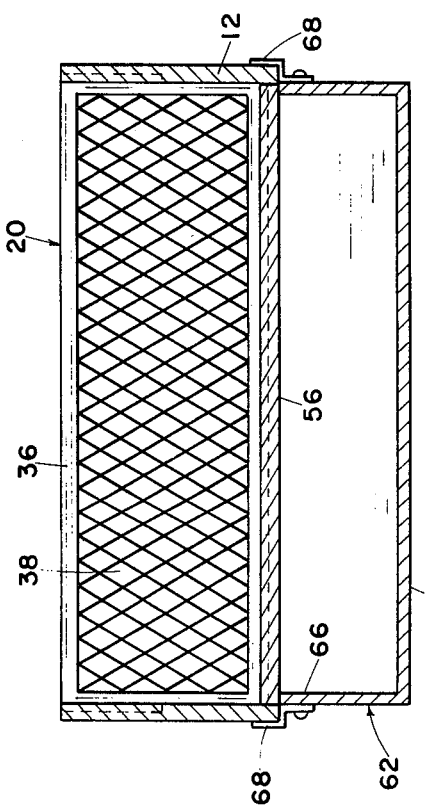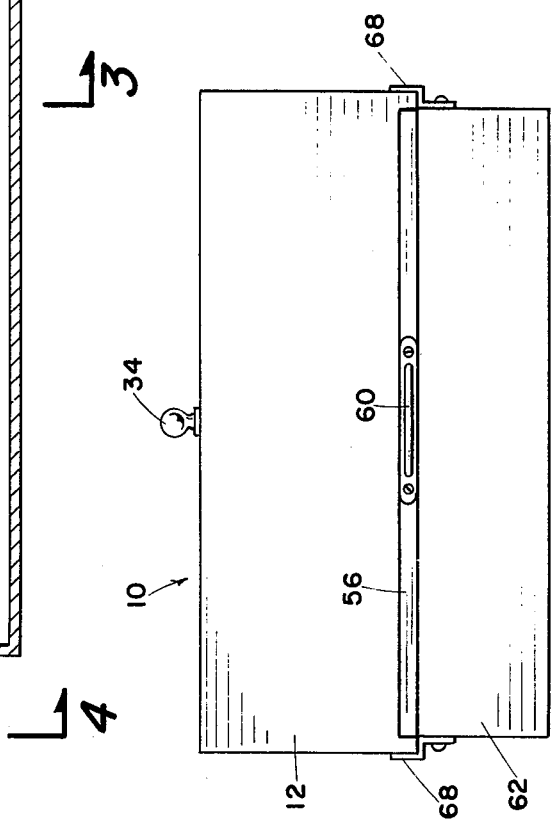

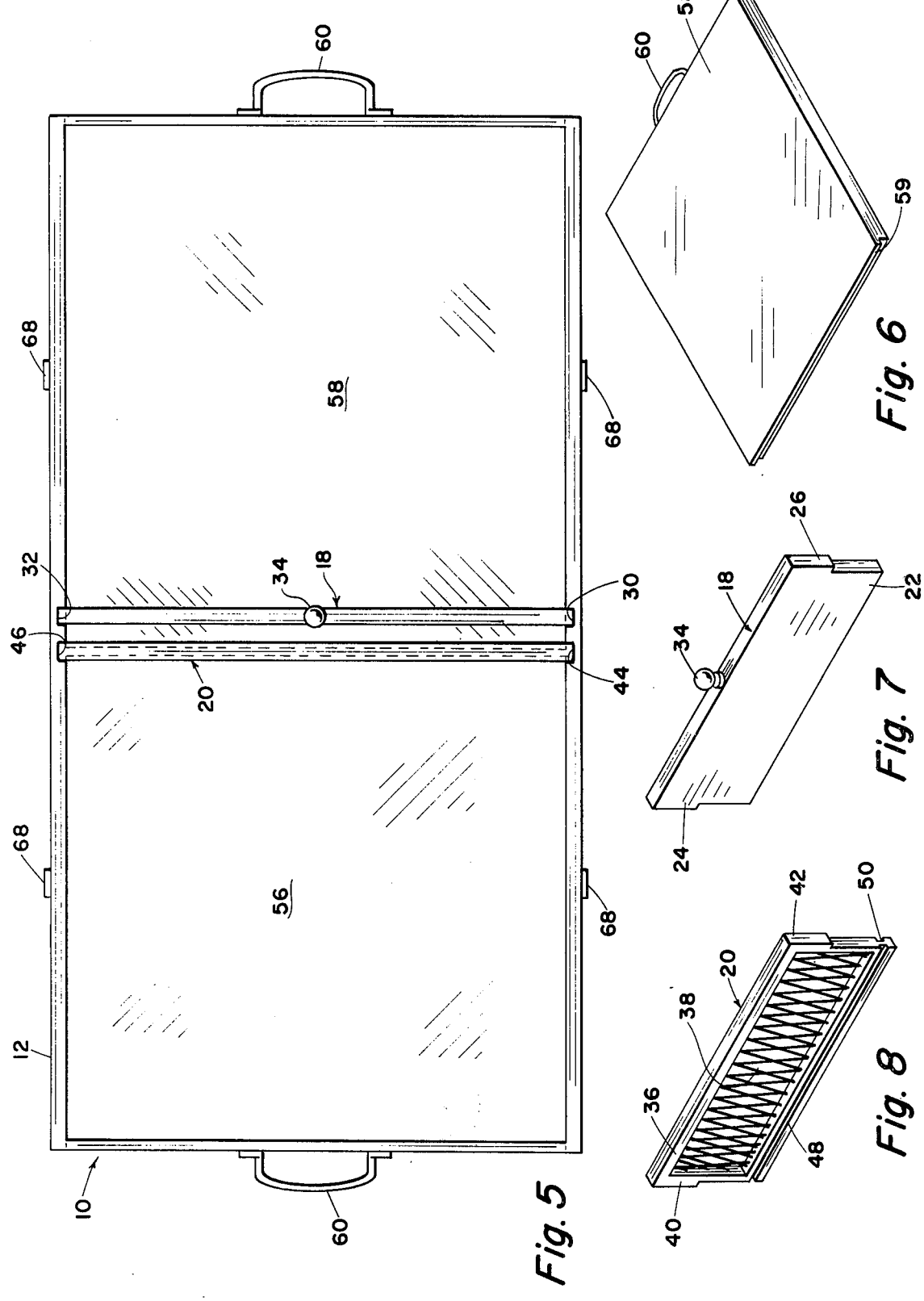

SELF-DEODORIZING LITTER BOX

BACKGROUND OF THE INVENTION

1. Field of the Invention

This invention relates to improvements in litter boxes for pets, and more particularly, but not by way of limitation, to a self-deodorizing litter box for cats.

2. Description of the Prior Art

Household pets are very popular today, and many pets, particularly cats, are kept substantially entirely within the house, apartment, or the like. Cats may be readily trained to use litter boxes and the like when they are not permitted outside, or otherwise. These litter boxes normally comprise an open box having a quantity of material similar to sand and commonly known as litter housed therein. The cat normally uses the litter for discharge of body wastes, such as urine and feces. After a period of time, the litter contained in the open box becomes extremely dirty, and the odor is usually offensive. Consequently the litter must be cleaned, discarded, or the like, which is an unpleasant task.

SUMMARY OF THE INVENTION

The present invention contemplates a novel self-deodorizing litter box for pets, and particularly for cats, which comprises a box having at least two open compartments therein having a partition and filter member therebetween. The filter member is constructed from a suitable filter material, such as wire mesh, or the like. A closed compartment is provided extending below both the open compartments, and an independent floor member is provided for each open compartment interposed between the open compartment and the closed compartment. The floor members are slidable between open and closed positions for selectively providing communication between the open compartments and the closed compartment. A suitable deodorizing chemical is contained in the closed compartment. A suitable quantity of litter material is deposited in one of the open compartments for use by the cat, or other pet, in the usual well-known manner. When the litter has been used a sufficient length of time wherein it becomes desirable to clean the litter. the entire litter box may be manually tilted in such a manner that the box is angularly disposed whereby the litter material in the said one open compartment will move through the partition and into the other open compartment by gravity. Any foreign matter which may be contained in the litter will be filtered therefrom by the partition and will remain in the said first compartment. Similarly, any large particles of the litter which may be present in the litter material will also be filtered from the material passing through the partition, thus resulting in only clean litter passing into the second open compartment. When all of the litter has thus been transferred to the second open compartment, only debris and residue will remain in the first open compartment.

At this time, the box may be restored to a normal upright position, and the floor of the first open compartment may be moved to the open position therefor to establish communication between the first compartment and the closed compartment therebelow. The debris and residue in the said first compartment will fall into the closed compartment by gravity. The floor of the open compartment may be moved to the closed position, and the debris and residue will be contained in the closed compartment with the deodorizing chemical therein. The use may be repeated between the open compartments until sufficient residue has accumulated in the lower compartment that it is desirable to empty the closed compartment.

BRIEF DESCRIPTION OF THE DRAWINGS

FIG. 2 is a sectional elevational view of a pet litter box embodying the invention.

FIG. 3 is a sectional view taken on line 3—3 of FIG. 2.

FIG. 4 is a view taken on line 4—4 of FIG. 2.

FIG. 5 is a plan view of a pet litter box embodying the invention.

FIG. 6 is a perspective view of a floor member such as utilized in the invention.

FIG. 7 is a perspective view of a partition as utilized in the invention.

FIG. 8 is a perspective view of a filter as utilized in the invention.

DESCRIPTION OF THE PREFERRED EMBODIMENT

Figure 1:
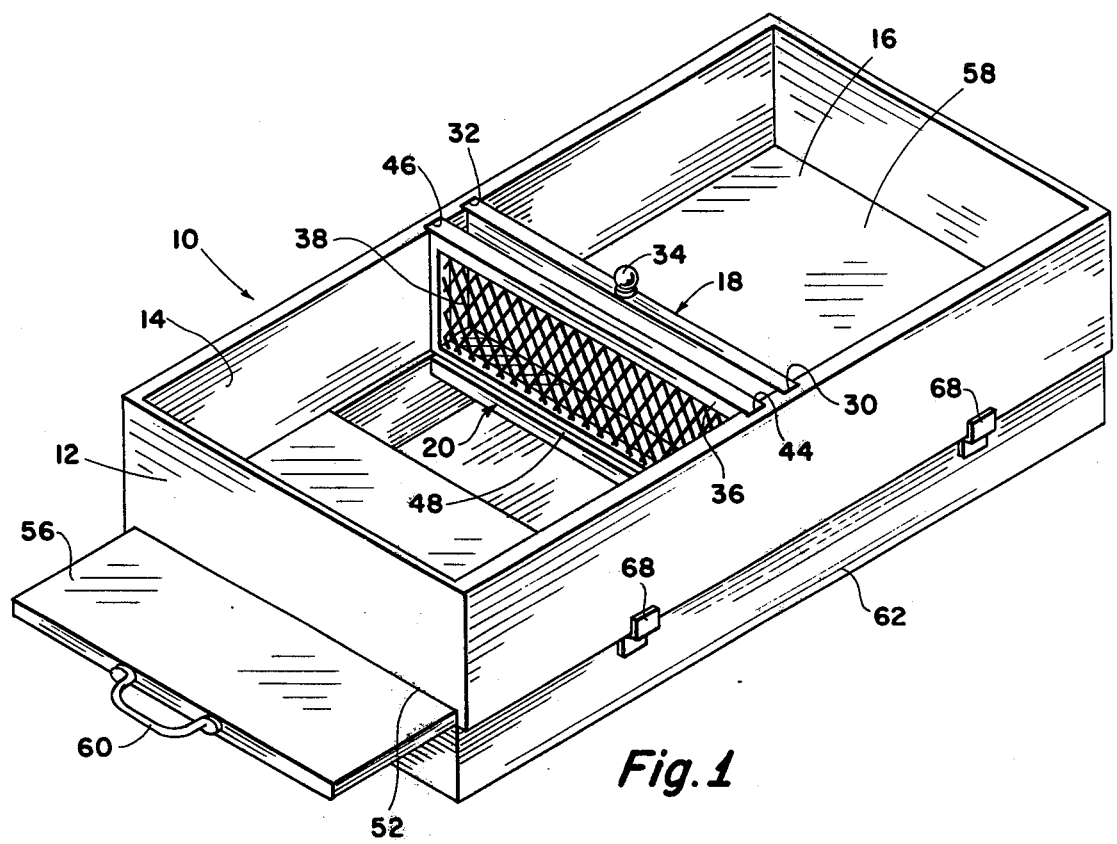
FIG. 1 is a perspective view of a pet litter box embodying the invention.
Figure 9:
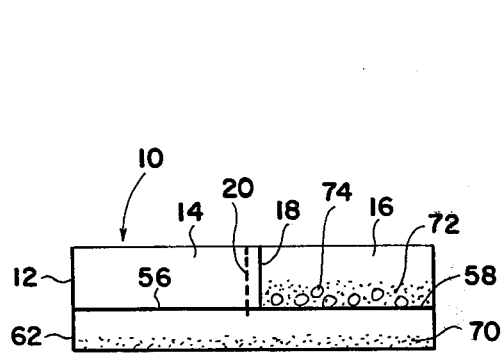
FIGS. 9 through 14 are schematic elevational views illustrating the use of a pet litter box embodying the invention.

Referring to the drawings in details, reference character 10 generally indicates a pet litter box comprising a substantially rectangular box 12 having the upper and lower ends thereof open as particularly shown in FIG. 1. The box 12 is divided into at least two open compartments 14 and 16 by a transversely extending substantially centrally disposed removable partition 18. In addition, a transversely extending filter member 20 is provided in the box 12 in slightly spaced relation to the partition 18 for a purpose as will be hereinafter set forth.

The partition 18 is preferably of a solid construction for clearly defining the two compartments 14 and 16 and providing a positive separation therebetween. As shown in FIG. 7, the partition 18 is provided with a lower portion 22 having a length substantially equal to the inner transverse dimension of the box 12 and a depth substantially equal to the internal depth of the box 12 for ease of disposition therein. The upper portion of the partition 18 is provided with oppositely disposed outwardly extending lug members 24 and 26 for sliding engagement with a pair of aligned oppositely disposed recesses 28 and 30 (FIGS. 1 and 5) provided on the inner periphery of the box 12. In addition, a suitable knob member 34 is provided on the upper edge of the partition 18 for facilitating removal thereof from the box 12 as will be hereinafter set forth.

The filter member 20 may be removably disposed in the box 12, but not limited thereto. The filter 20 comprises an outer substantially rectangular frame 36 having a suitable wire screen, mesh, grid, or the like, secured in the interior thereof as shown at 38. The length of the lower portion of the frame 36 is substantially equal to the interior width of the box 12, and a pair of oppositely disposed outwardly extending lugs 40 and 42, similar to the lugs 24 and 26, are provided at the upper portion of the frame 26 for engagement with oppositely disposed aligned recesses 44 and 46 provided on the inner periphery of the box 12 in spaced relation with respect to the recesses 30 and 32. The depth of the frame 36 is greater than the depth of the interior of the box 12, and the lowermost portion of the frame 36 is provided with oppositely disposed grooves 48 and 50 extending throughout the entire length thereof and disposed in substantial alignment with the lower edge of the interior of the box 12 for a purpose as will be hereinafter set forth.

The opposite ends of the box 12 are provided with aligned recesses 52 and 54, respectively, open to the bottom thereof, for slidably receiving floor plate members 56 and 58 therethrough, respectively. The recesses 52 and 54 are in substantial alignment with the grooves 48 and 50, respectively. The inner end of each floor plate 56 and 58 is provided with a tongue 59 (FIG. 6) for engagement with the grooves 48 and 50, and the inner end of the floor plate member 56 engages the groove 48 while the inner end of the floor plate 58 engages the groove 50, as particularly shown in FIG. 2. A suitable handle member 60 is preferably provided on the outer end of each floor plate 56 and 58 for facilitating removal of the floor plates from the box 12 as will be hereinafter set forth.

A second substantially rectangular box 62 is removably disposed immediately below the box 12 and particularly below the floor plates 56 and 58. The box 62 is closed at the bottom thereof by a plate 64 and the top thereof is open as shown at 66 in FIGS. 2 and 3. At least two support brackets 68 are provided on each side of the box 62 and spaced along the open end 66 thereof for removably receiving the bottom of he box 12 therein. The box 12 is preferably a relatively snug fit in the support brackets 68 for facilitating the use of the apparatus 10.

Figure 10:
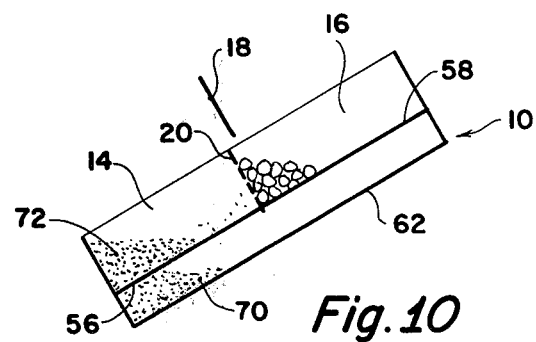

Referring now to FIGS. 9 through 14, in order to use the litter box 10, a suitable deodorizing chemical is initially deposited within the interior of the box 62, as indicated at 70, and suitable pet litter is deposited in one of the open compartments, such as the compartment 16, as shown at 72. The compartment 16 is open, as hereinbefore set forth, and is utilized in the normal manner by a cat, or other suitable house pet. During use, foreign debris, and the like, as indicated at 74, accumulates in the litter 72, and it becomes desirable to clean the litter 72 by removal of the debris 74. In order to clean the litter 72, the entire litter box 10 may be manually tilted as shown in FIG. 10 and the partition 18 may be removed from its position between the chambers 14 and 16 whereby the litter 72 flows or moves through the filter 20 by gravity from the chamber 16 into the chamber 14. The foreign particles 74, and the like, however, are trapped by the filter 20 and remain in the compartment 16.

Figure 11:
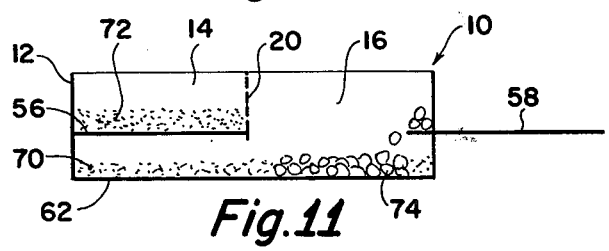
Figure 12:
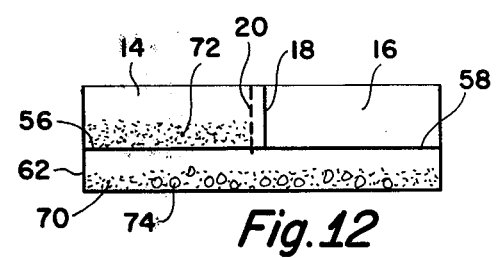

The litter box 10 may then be restored to the normal upright position therefore and, as shown in FIG. 11, the floor plate 58 may be manually grasped by the handle 60 thereof and moved outwardly to the open position therefor. The debris 74 then falls by gravity into the box 62 along with the deodorizing chemical 70. The floor plate 58 may be returned to the normal closed position therefor, as shown in FIG. 12, and the compartment 14 is now ready for use by the house pet in the usual manner (not shown) on the floor plates 56 and 58 for precluding an accidental complete withdrawal thereof from the litter box 10.

It will be apparent that suitable stop members or slide members (not shown) may be provided on the bottom of the upper box 12 in the proximity of the sides of the recesses 52 and 54 for retaining the floor members against accidental dislodging therefrom when the boxes 12 and 62 are separated.

In addition, it will be apparent that the boxes 12 and 62 may be molded, or otherwise constructed, as a unit, with slots provided for the floor members in lieu of the recesses 52 and 54, with the overall operation of the apparatus 10 being the same as hereinbefore set forth. Furthermore, the filter material provided for the filter member 20 may comprise a plurality of slightly spaced vertically disposed bars (not shown) in lieu of mesh, screen, or the like, if desired.

Figure 13:
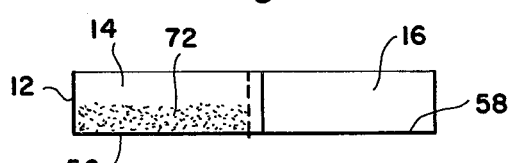
Figure 14:
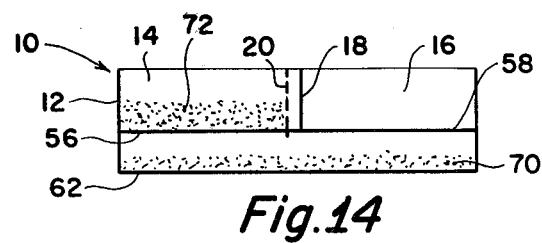

The foregoing operation may be repeated as necessary. It will be apparent that the debris 74 and chemical 70 will be contained within the closed box 62 until such time as it is desired to empty the contents of the box 62. At this time, the box 12 may be removed from the box 62 by manually grasping the handles 60 and moving the box 12 and contents aside, as shown in FIG. 13, whereupon the contents of the box 62 may be emptied in any well-known manner. The box 62 may be resupplied with the deodorizing chemical 70, and the entire operation may be repeated as desired.

From the foregoing, it will be apparent that the present invention provides a novel self-deodorizing pet litter box comprising an open upper box having at least two open compartments therein separated by a partition and filter member. A closed chamber or box is disposed beneath the open chambers, and movable floor plates are provided in each of the open compartments, interposed between the open compartment and the closed compartment. A suitable deodorizing chemical is stored in the closed chamber. Pet litter is provided in one of the open compartments for use by a house pet in the usual manner. When the litter has become sufficiently soiled, the litter may be transferred to the other open compartment through the filter for removing debris therefrom. The debris is restrained in the front open compartment, and opening of the floor member of the first compartment permits the trapped debris to fall by gravity into the closed compartment for storage with the deodorizing chemicals therein until such time as it is desired to replace the contents of the closed compartment. The novel pet litter box is simple and efficient in operation and economical and durable in construction.

Whereas the present invention has been described in particular relation to the drawings attached hereto, it should be understood that other and further modifications, apart from those shown or suggested herein, may be made within the spirit and scope of this invention.

What is claimed is:

1. A pet litter box comprising at least two open compartments for receiving a quantity of litter therein, a closed compartment disposed beneath the open compartments, independent removable floor plate means provided for each open compartment and interposed between the open compartment and the closed compartment, said floor plate means being movable between open and closed positions to provide selective communication between the open compartment and the closed compartment, removable partition means interposed between said open compartments to provide a positive separation therebetween, and filter means interposed between said open compartments for cleaning any litter moving from one open compartment to the other open compartment.

2. A pet litter box as set forth in claim 1 wherein the open compartments are removably supported above said closed compartment.

3. A pet litter box as set forth in claim 1 wherein the filter means comprises outer frame means, screen-like filter means disposed within said outer frame means, and oppositely disposed grooves provided in the frame means for removably receiving one edge of each independent floor plate means therein in the closed position of the floor plate means.

4. A pet litter as set forth in claim 1 wherein a deodorizing chemical is disposed in the closed compartment.

5. A pet litter box as set forth in claim 1 wherein the filter means is removable.

* * * * *